M. SPILLER.
LOSS PREVENTING DEVICE.
APPLICATION FILED APR. 24, 1917.
1,262,125.
Patented Apr. 9, 1918.
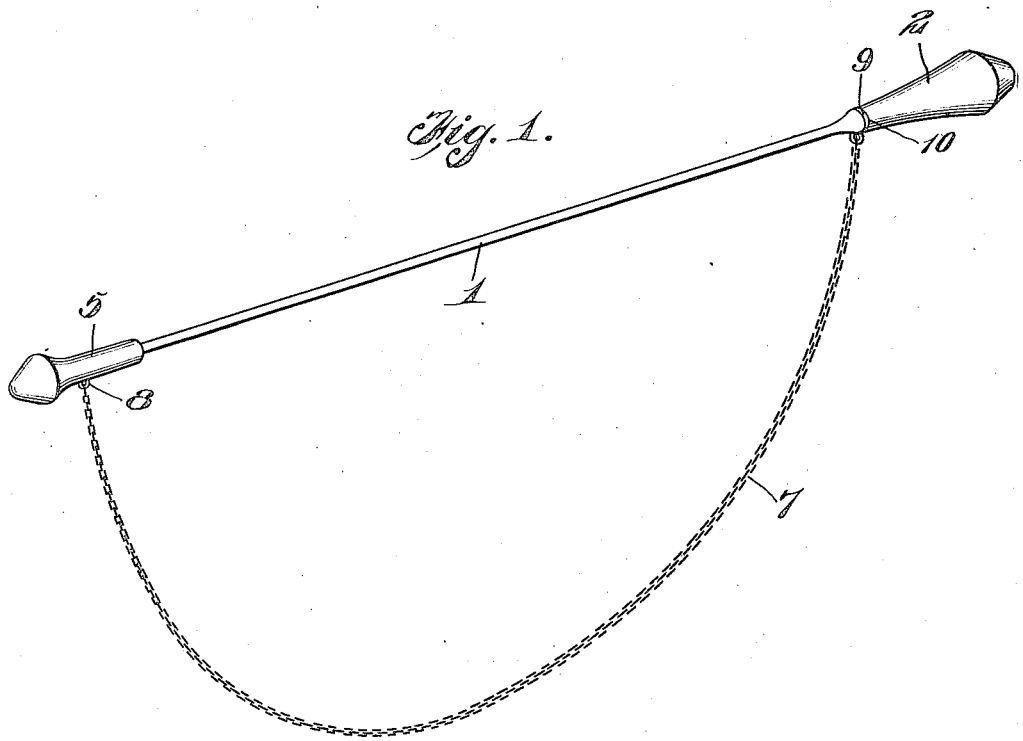
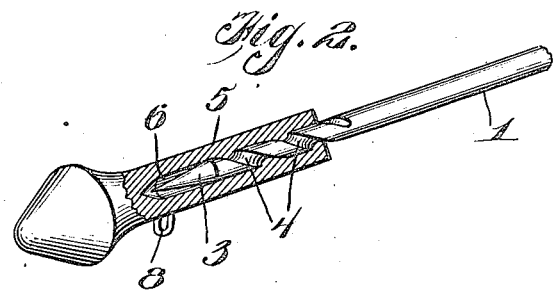
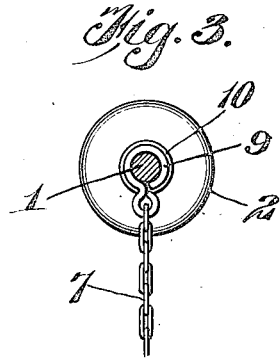
Witness
J. R. Heinrichs
Inventor
M. Spiller
By C. C. Hines,
Atty

UNITED STATES PATENT OFFICE.

MARY SPILLER, OF CARNEY, MICHIGAN.

LOSS-PREVENTING DEVICE.

1,262,125.

Specification of Letters Patent.

Patented Apr. 9, 1918.

Application filed April 24, 1917. Serial No. 164,212.

*To all whom it may concern:*

Be it known that I, MARY SPILLER, a citizen of the United States, residing at Carney, in the county of Menominee and State of Michigan, have invented new and useful Improvements in Loss-Preventing Devices, of which the following is a specification.

This invention relates to loss preventing devices and particularly to an improved hatpin, hatpin guard or protector, and means for preventing loss or accidental displacement of the guard or protector from the pin proper.

The primary object of the invention is to provide a device of the character described in which the free end of the pin is externally threaded for engagement with an internally threaded socket in the guard or protector, which guard or protector is connected by a loss preventing chain with the head or shank of the chain in such a manner as to prevent the chain from winding or twisting on the pin or about the guard or protector during the operation of threading the guard on to or off the threaded end of the pin.

The invention consists of the features of construction, combination and arrangement of parts, hereinafter fully described and claimed, reference being had to the accompanying drawing, in which:—

Figure 1 is a perspective view of the improved hatpin, guard or protector and loss preventing chain, showing the guard applied to the pin.

Fig. 2 is a perspective view of the free end of the pin and of the guard, the latter appearing partly in section, showing the construction of such parts for engagement with each other.

Fig. 3 is a section through the pin and connecting ring of the chain, showing the swiveled connection.

Referring to the drawing, 1 designates the hatpin proper, which is provided at one end with an ornamental head or knob 2 and at its opposite end with a tapered point 3, which point is provided with a spiral thread 4, preferably in the form of a spiral groove.

A guard or protector 5 is provided to fit upon the pointed end of the pin and is formed with an internally threaded socket 6 to receive such portion of the pin. This guard may be of any suitable form, and may be constructed to conform in appearance to the knob 2, both the knob and the guard being made, if desired, of ornamental contour or provided with ornamentation of any desired character. When the guard is applied to the pin, it will hold the pin from any possibility of becoming lost or accidentally misplaced from the hat, and will also shield the point of the pin to prevent injury to the hands of the wearer or injury to other persons.

For the purpose of connecting the guard with the pin and preventing its loss or misplacement, a loss preventing chain 7 is employed. This chain is suitably secured at one end as at 8, to the guard, and is connected at its opposite end with a ring 9. This ring 9 engages an annular groove 10 formed in the pin, at the point of juncture of the pin with the knob 2, the shoulders formed by the side walls of the groove serving to hold the ring in position and prevent it from sliding out of place or otherwise getting out of proper position. This ring is, however, free to move around the groove, thus forming a swiveled connection between the chain and the pin, whereby relative rotary movement between the pin and end of the chain connected therewith is promoted. The chain is of sufficient length in projection to extend around at least one-half of the circumference of the hat, so that after the pin is passed through the hat and hair of the wearer the guard or protector may be applied to the projecting pointed end of the pin at the side of the hat opposite that on which the head 2 is arranged as will be readily understood.

It will, of course, be understood that the chain may be made of any suitable metal and of a character to add to the ornamental appearance of the device as a whole, thus providing a pin, guard and loss preventing chain which may be either inexpensively or expensively manufactured to suit the taste or fancy of the manufacturer or purse of the wearer. In the practical use of the device a practical advantage is gained by swiveling the chain to the pin, inasmuch as by this construction the pin itself may be turned or rotated to thread its point into or out of the socket of the guard without the chain winding upon the pin or otherwise becoming twisted or entangled, the chain, by reason of its weight, maintaining its normal position by gravity while the pin is being applied or removed.

Having thus described my invention, I claim:

1. In a loss preventing device, the combination of a hatpin, a guard or protector for the free end of the pin, said guard and pin being provided with engaging surfaces for connection and disconnection respectively by reverse rotary movements of the pin, a flexible loss preventing element connected at one end to the pin, and means rotatably connecting the opposite end of the loss preventing element with the pin whereby to permit rotary movements of the pin without winding said loss preventing element about the pin.

2. In a loss preventing device, the combination of a hatpin having a threaded surface at its pointed end, a guard having an internally threaded socket to receive the pointed and threaded end of the pin, a loss preventing chain connected at one end with the guard, and a connecting member at the opposite end of the chain loosely encircling the headed end of the pin and in which said pin is fitted to freely turn or rotate about its axis, whereby rotation of the pin is permitted without winding the chain about the pin.

3. In a loss preventing device, the combination of a hatpin embodying a pin proper and a head, and formed with an annular groove at the point of intersection of said portions, the free end of said pin being provided with a screw thread, a guard having a threaded socket to fit upon the threaded end of the pin, a chain connected at one end to the guard, and a ring upon the opposite end of the chain rotatably engaging the groove in the pin, whereby relative rotation between the guard and pin is permitted without winding the chain about the pin.

4. In a loss preventing device, the combination of a hatpin provided with screw threads at one end thereof and a fixed head at the other end thereof, said pin and head being formed at their point of juncture with an annular groove providing opposed shoulders, a guard having a threaded socket to fit upon the threaded end of the pin, a double eye having one of its eye members swiveled within said groove and held from longitudinal movement by said shoulders, and a chain or like flexible connection secured at one end to the guard and at its opposite end to the other eye member of the said double eye member.

In testimony whereof I affix my signature.

MARY SPILLER.